(12) United States Patent
Omoso (10) Patent No.: US 9,751,179 B2
(45) Date of Patent: Sep. 5, 2017

(54) LATHE POSITIONING APPARATUS

(71) Applicant: YUGEN KAISHA OMOSO TEKKO, Yasugi-shi, Shimane (JP)

(72) Inventor: Yasutaka Omoso, Yasugi (JP)

(73) Assignee: YUGEN KAISHA OMOSO TEKKO, Shimane (JP)

( * ) Notice: Subject to any disclaimer, the term of this patent is extended or adjusted under 35 U.S.C. 154(b) by 176 days.

(21) Appl. No.: 14/389,470

(22) PCT Filed: Mar. 11, 2013

(86) PCT No.: PCT/JP2013/056625
§ 371 (c)(1),
(2) Date: Sep. 30, 2014

(87) PCT Pub. No.: WO2013/150863
PCT Pub. Date: Oct. 10, 2013

(65) Prior Publication Data
US 2015/0059541 A1    Mar. 5, 2015

(30) Foreign Application Priority Data

Apr. 5, 2012    (JP) .................................. 2012-086352

(51) Int. Cl.
*B23Q 16/02*        (2006.01)
*B23Q 16/00*        (2006.01)
*B23B 25/06*        (2006.01)

(52) U.S. Cl.
CPC ............ *B23Q 16/002* (2013.01); *B23B 25/06* (2013.01); *Y10T 82/2574* (2015.01); *Y10T 82/2579* (2015.01)

(58) Field of Classification Search
CPC .. B23Q 16/002; B23Q 16/001; B23B 13/121; B23B 13/12; Y10T 279/3487; Y10T 82/2574; Y10T 82/2579; Y10T 82/2572
See application file for complete search history.

(56) References Cited

U.S. PATENT DOCUMENTS 2,415,482 A * 2/1947 Greenough ........... B23B 31/207
                                                                279/50
3,385,607 A * 5/1968 Hughes ................. B23B 31/207
                                                                279/156
(Continued)

FOREIGN PATENT DOCUMENTS

JP          5-63702 U      8/1993
JP          6-31903 U      4/1994
(Continued)

OTHER PUBLICATIONS

International Search Report for the Application No. PCT/JP2013/056625 mailed Jun. 4, 2013.

*Primary Examiner* — Daniel Howell
*Assistant Examiner* — Nicole N Ramos
(74) *Attorney, Agent, or Firm* — Cheng Law Group, PLLC (57) ABSTRACT

The purpose of the present invention is to provide a lathe positioning apparatus such that a work held by a chuck can be positioned at an arbitrary position in main shaft direction and the installation space and the size of the apparatus can be decreased. A lathe positioning apparatus for positioning a work W held by a chuck 6 in a main shaft 4 direction is provided with an apparatus body 12 having a shaft center along the main shaft 4 direction. An abutting portion 26 for abutting the work W is formed on a chuck 6 side end of the apparatus body 12. A mechanism for advancing or withdrawing the abutting portion 26 with respect to the chuck 6 is provided. An extension/contraction mechanism for extending or contracting the apparatus body 12 in the main shaft 4 direction is provided in the apparatus body 12. The abutting portion 26 is advanced or withdrawing with respect to the chuck 6 by the extending or contracting by the extension/contraction mechanism.

4 Claims, 10 Drawing Sheets

(56) References Cited

U.S. PATENT DOCUMENTS 3,540,748 A * 11/1970 Buck .................... B23B 31/208
 279/155
3,779,566 A * 12/1973 Tarbox ................. B23B 31/208
 279/156
4,552,370 A * 11/1985 Baumgartner ........ B23B 31/208
 279/156

FOREIGN PATENT DOCUMENTS

| JP | 6-328305 A | 11/1994 |
| JP | 2008-149419 A | 7/2008 |

* cited by examiner

LATHE POSITIONING APPARATUS

TECHNICAL FIELD

This invention relates to a lathe positioning apparatus for positioning a chucked work at an arbitrary position in a main shaft direction.

BACKGROUND ARTS

For use in positioning a chucked work in a main shaft direction, there is known such a lathe positioning apparatus disclosed in a patent document 1 as to have an apparatus body having a shaft center along the main shaft direction, wherein an abutting portion that abuts the work is formed on a chuck-side end of the apparatus body, and a mechanism for advancing or withdrawing the abutting portion with respect to a chuck is provided.

TECHNICAL LITERATURE IN THE RELATED ARTS

Patent Document

Patent document 1: Japanese Unexamined Utility Model Application Publication No. Hei 5-63702

SUMMARY OF THE INVENTION

Problems to be Solved by the Invention

The lathe positioning apparatus in the above patent document allows the work to be positioned at the arbitrary position in the main shaft direction by advancing or withdrawing of the abutting portion (which is referred to as a work stopper member in the above patent document) provided on an advancing-side end of a rod member (which is referred to as a connecting rod in the above patent document) that configures the apparatus body. Therefore, highly accurate machining on works of various lengths is obtained.

However, advancing or withdrawing of the abutting portion is provided by axial reciprocation of the whole of the rod member using a screw feeding mechanism that configures an advancing/withdrawing means arranged outside a lathe separately from the apparatus body. For that reason, there is the need for securing a certain length corresponding to a movable range of the abutting portion in addition to an overall length of the rod member. Besides, an arrangement that the screw feeding mechanism is provided beneath such a withdrawing-side portion in the rod member as projecting from the lathe results in an increased size of the lathe positioning apparatus itself as well.

It is an object of the present invention to provide a lathe positioning apparatus such that a chucked work is positioned at an arbitrary position in a main shaft direction, and an installation space and a size of the apparatus itself may be decreased.

Means for Solving the Problems

In accordance with the present invention, there is provided a lathe positioning apparatus for positioning a chucked work in a main shaft direction, the lathe positioning apparatus comprising an apparatus body having a shaft center along the main shaft direction and arranged such that an abutting portion that abuts the work is formed on a chuck-side end of the apparatus body, and an extension/contraction mechanism provided inside the above apparatus body to advance or withdraw the abutting portion with respect to a chuck by extending or contracting the apparatus body in the main shaft direction.

It would be possible also to provide the lathe positioning apparatus such that the above apparatus body has the same shaft center as a main shaft, and extending or contracting of the apparatus body is provided on the shaft center of the main shaft by the above extension/contraction mechanism.

It would be possible also to provide the lathe positioning apparatus such that the above apparatus body has a fixed body and a movable body both having the same shaft center as the main shaft, the fixed body is axially fixed in position, the movable body is connected to the fixed body slidably in the main shaft direction, and the above extension/contraction mechanism is provided to change a length of the above apparatus body in the main shaft direction by moving the above movable body slidably in the main shaft direction with respect to the fixed body.

It would be possible also to provide the lathe positioning apparatus such that a prevention means provided in a part of connection of the fixed body to the movable body to prevent a play in the above part of connection is included.

It would be possible also to provide the lathe positioning apparatus such that the above extension/contraction mechanism has a screw mechanism for moving the above movable body slidably in the main shaft direction with respect to the fixed body, and an operation shaft arranged inside the above fixed body so as to have the same shaft center as the above fixed body in order to actuate the screw mechanism by rotation about an axis of the operation shaft itself.

It would be possible also to provide the lathe positioning apparatus such that the above screw mechanism has a screw formed on an outer periphery of the operation shaft, the above movable body that permits the operation shaft to be inserted through in screw engagement, and a regulation means for regulating rotation of the movable body around the operation shaft with respect to the fixed body.

It would be possible also to provide the lathe positioning apparatus such that the above movable body is provided in the form of a plurality of cylindrical-shaped movable bodies different in diameter from each other, the above fixed body is provided in the form of a cylindrical-shaped fixed body having an outer periphery brought into screw engagement with an inner periphery of the smallest-diameter movable body, connection of the above plurality of movable bodies themselves is made in order by inserting an outer periphery of one movable body of smaller diameter in a pair of movable bodies nearest each other in diameter into an inner periphery of the other movable body of large diameter in screw engagement, and the above screw mechanism is composed of a screw formed on the outer periphery of the fixed body and screws respectively formed on the outer periphery of the smallest-diameter movable body and the inner periphery of each movable body other than the largest-diameter movable body.

Effects of the Invention

The abutting portion is advanced or withdrawn with respect to the chuck by the extension/contraction mechanism for extending or contracting the apparatus body in the main shaft direction. Therefore, as long as a space corresponding to the overall length of the apparatus body is only secured, the need for securing a space corresponding to the movable range of the abutting portion is eliminated, and as a result, an installation space may be decreased. Besides, because of an arrangement that the extension/contraction mechanism is provided inside the apparatus body, a decrease in the whole apparatus size is also obtained.

MODES FOR EMBODYING THE INVENTION

Figure 1:
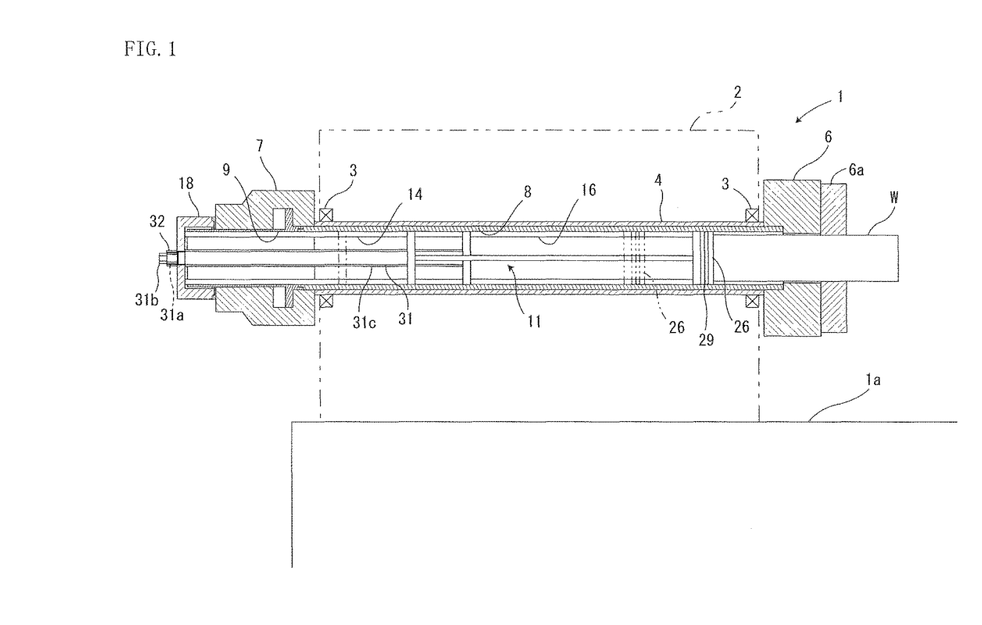
FIG. 1 is a side view showing the main configuration of a lathe provided with a positioning apparatus of the present invention.

FIG. 1 is a side view showing the main configuration of a lathe provided with a positioning apparatus of the present invention. A lathe 1 that is a kind of machine tool has a head stock 2 installed on a main frame 1a, a cylindrical-shaped main shaft 4 supported on the head stock 2 rotatably about an axis of the main shaft itself with one or more than one bearing portion 3, a chuck 6 attached and fixed to one end of the main shaft 4 to grip and hold a work W that is an object to be machined (or a workpiece), and a chuck cylinder 7 attached to the other end of the main shaft 4.

To the main shaft 4 is transmitted motor (not shown) or like power through a chain or a gear or the like. The main shaft 4 is driven for rotation together with the chuck 6 and the chuck cylinder 7 in a body. With this action, the work W held by the chuck 6 is also rotated integrally. It is noted that the head stock 2 itself may be a drive motor for driving the main shaft 4 for rotation. In this case, the need for any mechanism that transmits power to the main shaft 4 will be eliminated.

The chuck 6 has more than one gripping claw 6a whose diameter is reduced or enlarged by an opening/closing mechanism (not shown). To this opening/closing mechanism is connected a cylindrical-shaped draw pipe 8 arranged such as to have the same shaft center as the main shaft 4 and be fitted to an inner peripheral surface of the main shaft 4. The draw pipe 8 is supported slidably for reciprocation in a main shaft-4 direction.

Such advancing or withdrawing action of the draw pipe 8 in the main shaft-4 direction causes more than one gripping claw 6a to act in a direction to reduce or enlarge its diameter, so that the chuck 6 is opened or closed. Such opening or closing action of the chuck 6 permits the work W to be detachably held by the chuck 6 under the condition that the work center is located on the shaft center of the main shaft 4.

The chuck cylinder 7 has at the inside thereof a cylindrical-shaped piston 9 having the same shaft center as the draw pipe 8 such as to be movable for reciprocation in an axial direction of the piston itself. The piston 9 is integrally connected and fixed to the draw pipe 8. The piston 9 is driven for reciprocation with a hydraulic system (not shown). The draw pipe 8 is reciprocated axially by such driving of the piston for reciprocation. In other words, the chuck 6 is opened or closed to permit the work W to be held or released by advancing or withdrawing the piston 9 and the draw pipe 8 by hydraulic actuation of the chuck cylinder 7.

Further, an inner peripheral surface of the piston 9 and that of the draw pipe 8 are integrally connected together. In addition to the above, the piston 9 is placed such that the end thereof is projecting from the chuck cylinder 7 toward the side opposite to the chuck 6. On an inner peripheral side of the piston 9 and that of the draw pipe 8, there is formed a cylindrical-shaped space whose opposite ends are open.

For the lathe 1 having the above configuration, when the work W is of great length in the main shaft-4 direction, machining on such work W occurs under the condition that the end of the work W is projecting from the chuck 6 toward the inner periphery side of the draw pipe 8 within the main shaft 4. In such a case, it is preferable that there is provided a positioning apparatus (or a lathe positioning apparatus) 11 for positioning the work W in the main shaft-4 direction, wherein more stable grip of the work W with the chuck 6 is provided by such positioning member 11 for machining. It is noted that any limitation is not particularly imposed on machining means, and therefore, various types of machining such as drilling and cutting are made on the rotating work W.

Next will be described the configuration of the positioning apparatus 11 provided in accordance with an application of the prevent invention with reference to FIGS. 1 to 7.

Figure 2:
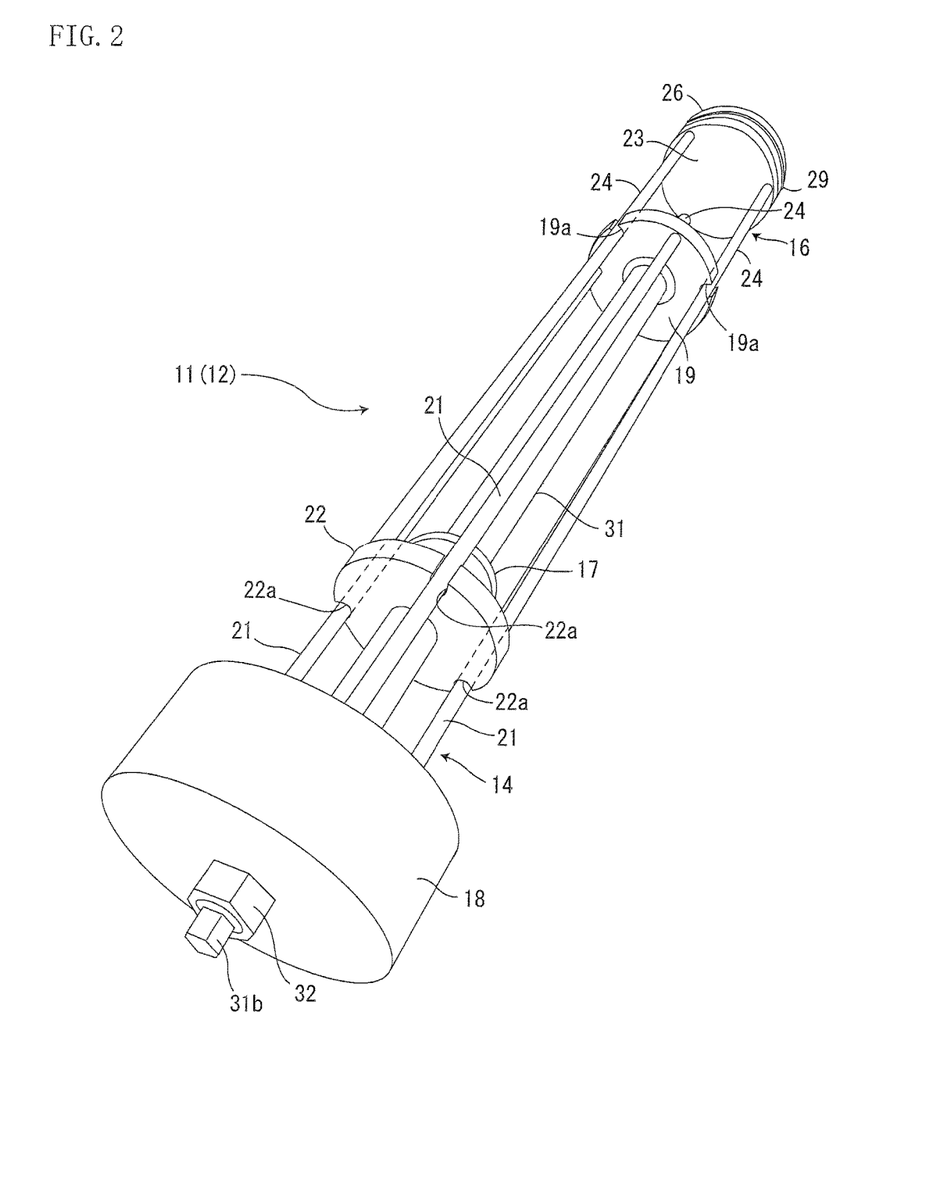
FIG. 2 is a perspective view of the positioning apparatus shown in FIG. 1.
Figure 3:
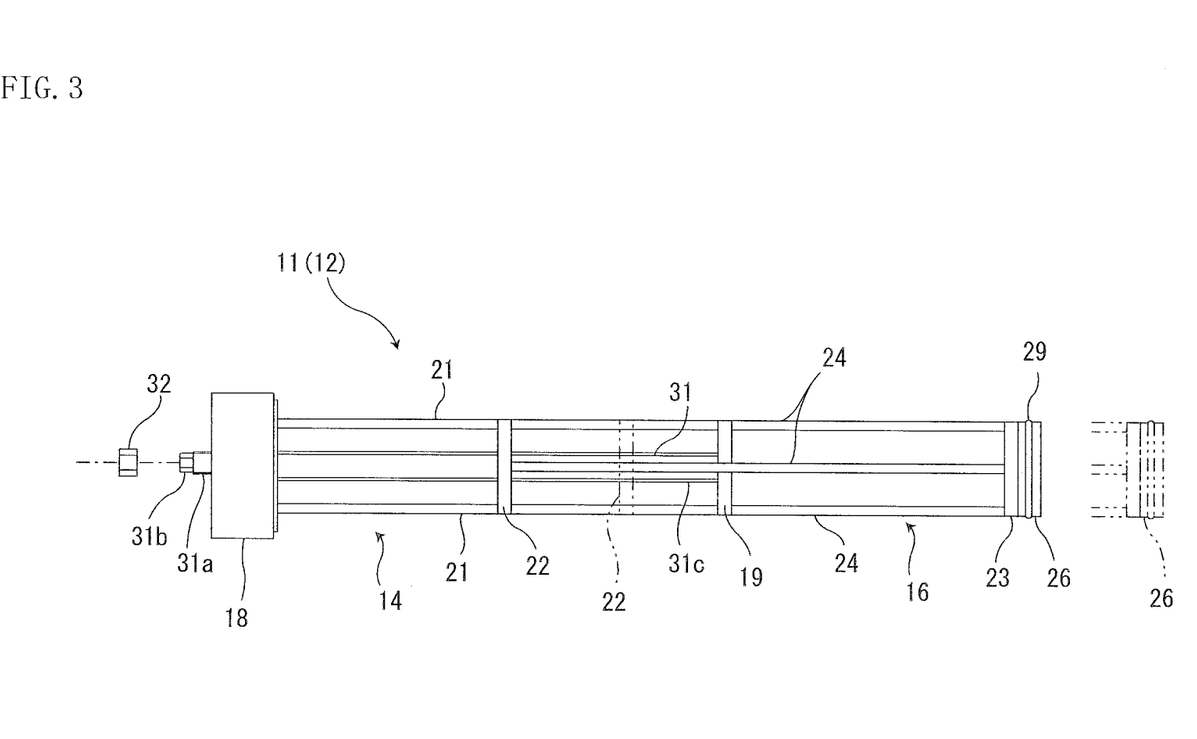
FIG. 3 is a side view of the positioning apparatus shown in FIG. 1.
Figure 4:
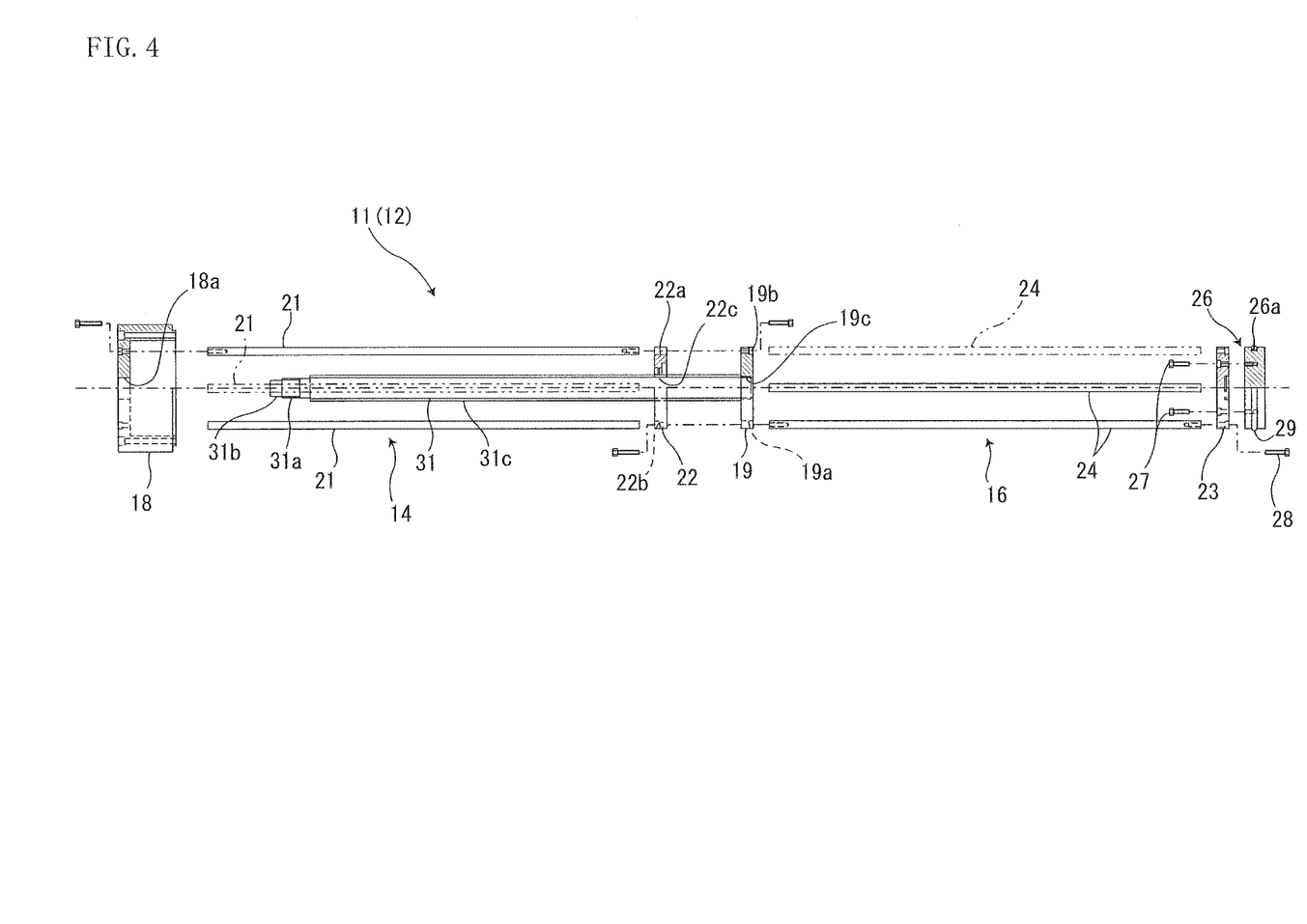
FIG. 4 is an exploded side view of the positioning apparatus shown in FIG. 1.

FIGS. 2 to 4 are respectively a perspective view, a side view and an exploded side view of the positioning apparatus shown in FIG. 1. The positioning apparatus 11 has an apparatus body 12 having the same shaft center as the main shaft 4. The positioning apparatus 11 is formed in a cylindrical shape as a whole. In use, the above positioning apparatus 11 is placed inside the main shaft 4 (more specifically, the inner peripheral side of the draw pipe 8) in an inserted state.

The apparatus body 12 has a fixed body 14 and a movable body 16 both extending in the main shaft-4 direction so as to have the same shaft center as the main shaft 4. The fixed body 14 is arranged at a chuck cylinder-7 side. The movable body 16 is arranged at a chuck-6 side. The fixed body 14 is detachably bolted to the chuck cylinder 7 (or one end side of the main shaft 4). The movable body 16 is connected to the fixed body 14 slidably in the main shaft-4 direction. In a part of connection of the movable body 16 to the fixed body 14, there is interposed a play prevention mechanism (or a prevention means) 17.

Such reciprocative slide action of the movable body 16 with respect to the fixed body 14 causes the positioning apparatus 11 (or the apparatus body 12) to be extended or contracted. Such extending or contracting action of the positioning apparatus permits the movable body 16 to be advanced or withdrawn with respect to the work W held by the chuck 6. Fixation of the fixed body 14 to the chuck cylinder 7 permits the positioning apparatus 11 (or the apparatus body 12) to be rotated together with the main shaft 4, the chuck cylinder 7, the chuck 6 and the work W in a body.

The fixed body 14 has a bottomed cylindrical-shaped mounting sleeve (or a mounting portion) 18 whose advancing-side end is open, a disc-shaped regulation plate 19 arranged at an open side of the mounting sleeve 18 so as to be spaced at a fixed distance apart, and a plurality of connecting rods 21 (or three rods as for the illustrated embodiment) for connecting the mounting sleeve 18 and the regulation plate 19 together so as to confront in parallel each other under the condition that the center of the mounting sleeve 18 and that of the regulation plate 19 are located on the shaft center of the apparatus body 12.

Each connecting rod 21 is formed linearly in parallel to the shaft center of the apparatus body 12. These connecting rods 21 are spaced uniformly (or every ⅓ round as for the illustrated embodiment) around the shaft center of the apparatus body 12. In addition to the above, the opposite ends of each connecting rod 12 are detachably and firmly bolted to the regulation plate 19 and the mounting sleeve 18 respectively.

The movable body 16 has a withdrawing-side disc-shaped movable plate 22, an advancing-side disc-shaped abutting-side plate 23, a plurality of connecting rods 24 (or three rods as for the illustrated embodiment) for connecting the movable plate 22 and the abutting-side plate 23 together so as to confront in parallel each other with a space of a predetermined distance under the condition that the center of the movable plate 22 and that of the abutting-side plate 23 are located on the shaft center of the apparatus body 12, and a disc-shaped abutting member (or an abutting portion) 26 attached and fixed to an advancing-side surface of the abutting-side plate 23 in an overlapped state.

Each connecting rod 24 is formed linearly in parallel to the shaft center of the apparatus body 12. These connecting rods 24 are spaced uniformly (or every ⅓ round as for the illustrated embodiment) around the shaft center of the apparatus body 12. The opposite ends of each connecting rod 24 are detachably and firmly bolted to the movable plate 22 and the abutting-side plate 23 respectively.

Figure 5A:
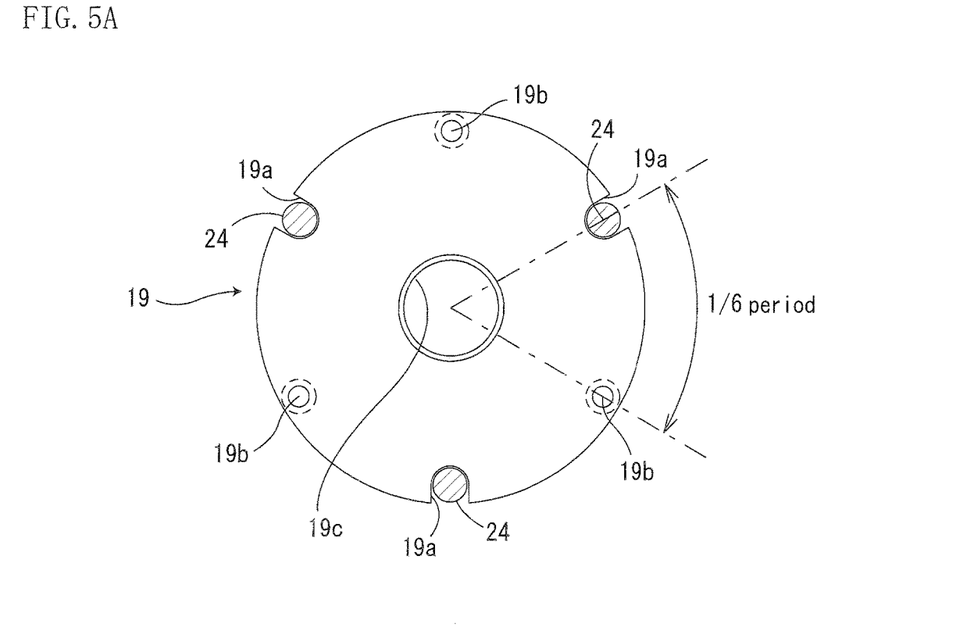
FIG. 5(A) is a rear view of a regulation plate.
Figure 5B:
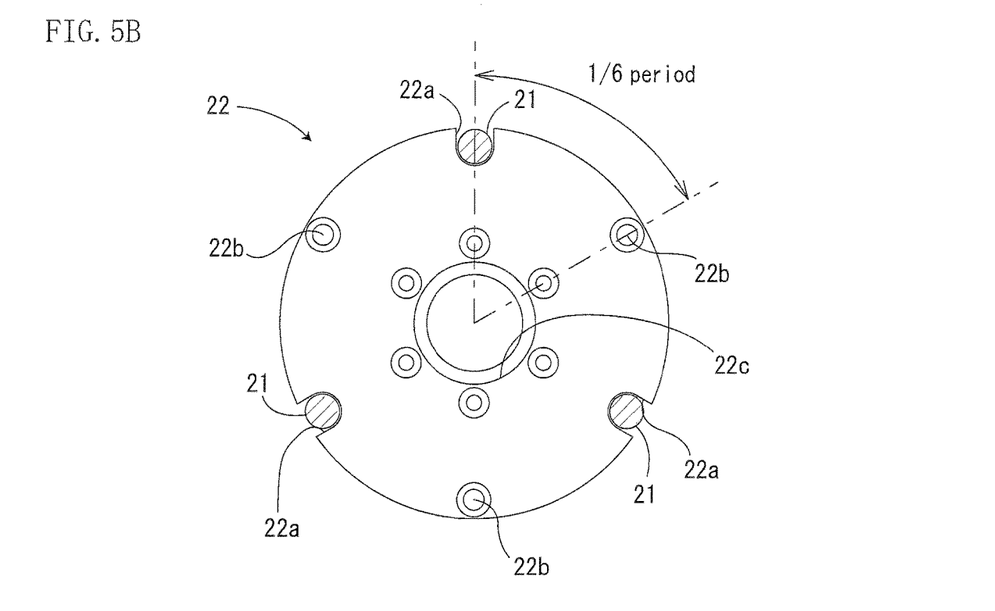
FIG. 5(B) is a rear view of a movable plate.

FIG. 5(A) is a rear view of the regulation plate, and FIG. 5(B) is a rear view of the movable plate. In a peripheral edge of the movable plate 22 shown, there are provided the same number of engaging grooves 22*a* as the connecting rods 21 on the fixed body-14 side to permit the above connecting rods 21 to be inserted through and engaged therewith individually. In a peripheral edge of the regulation plate 19, there are provided the same number of engaging grooves 19*a* as the connecting rods 24 on the movable body-16 side to permit the above connecting rods 24 to be inserted through and engaged therewith individually.

The regulation plate 19 of the fixed body 14 is arranged within the movable body 16 such that the fixed body 14 and the movable body 16 may alternate in a partially mutually overlapped state. The movable plate 22 of the movable body 16 is arranged within the fixed body 14. These connecting rods 21 on the fixed body-14 side are slidably inserted through and engaged with the corresponding engaging grooves 22*a* of the movable plate 22. These connecting rods 24 on the movable body-16 side are slidably inserted through and engaged with the corresponding engaging grooves 19*a* of the regulation plate 19, and as a result, connection of the movable body 16 to the fixed body 14 is established under the condition that the movable body 16 makes no rotation about the axis with respect to the fixed body 14, while it is axially slidable with respect to the fixed body 14.

It is noted that the regulation plate 19 and the movable plate 22 are such that the phases (or the grooved positions) of the engaging grooves 19*a*, 22*a* that permit the connecting rods 21, 24 to be inserted through and engaged therewith are shifted by a specified distance to bolt holes 19*b*, 22*b* for bolting in the connecting rods 21, 24. For the illustrated embodiment, the bolt holes 19*b*, 22*b* and the engaging grooves 19*a*, 22*a* respectively adjacent to each other are spaced at intervals of ⅙ period.

In this connection, the abutting member 26, the abutting-side plate 23, the movable plate 22 and the regulation plate 19 are all set to have the same shaft center and the same diameter. The bolt holes 19*b*, 22*b* and the engaging grooves 19*a*, 22*a* for the connecting rods 21, 24 in the abutting-side plate 23, the movable plate 22 and the regulation plate 19 are all formed in peripheral end positions.

The abutting member 26 is detachably bolted to the abutting-side plate 23 with a bolt 27 inserted into the abutting-side plate 23 from its withdrawing-side surface. A bolt hole 26*a* for the bolt 27 is located closer to the center in the abutting-side plate 23 than a bolt 28 for mounting of the connecting rod 24. Further, in an outer periphery of the abutting member 26, there is provided an engaging groove 26*a* over the whole, and to the engaging groove 26*a* is mounted an O ring 29.

Between the mounting sleeve 18 and the regulation plate 19, there is provided a linearly-extending operation shaft 31 having the same shaft center as the apparatus body 12 and the main shaft 4 such as to be rotatable about an axis of the operation shaft itself. More specifically, the opposite ends of the operation shaft 1 are inserted rotatably into support holes 18*a*, 19*c* respectively provided in the center of a bottom portion of the mounting sleeve 18 and the center of the regulation plate 19.

As for the operation shaft 31, on its portion situated such as to be projecting from an outside end surface of the mounting sleeve 18 after being inserted through the support hole 18*a* of the mounting sleeve 18, there is formed a screw 31*a* that permits a locking nut 32 to be engaged therewith. The more fore end of the operation shaft 31 than a screw-31*a* portion thereof provides a prismatic portion 31*b* having a polygonal (more specifically, hexagonal) shape in cross section so as to permit the operation shaft 31 to be turned about the axis with a spanner or the like.

On an outer periphery of the operation shaft 31, there is formed a screw 31*c*. In the center of the movable plate 22, there is formed a screw hole 22*c*. The operation shaft 31 is inserted through the screw hole 22*c* in screw engagement. Because of such arrangement that the movable body 16 makes no rotation about the axis with respect to the fixed body 14 as described the above, rotation of the operation shaft 31 about the axis causes the whole of the movable body 16 to be screw-fed in the main shaft-4 direction with respect to the fixed body 14 through the movable plate 22, so that the apparatus body 12 is extended or contracted, thus allowing the abutting member 26 to be advanced or withdrawn with respect to the chuck-6 side.

Then, the abutting member 26 is fixed in predetermined advanced or withdrawn position by tightening and fixing the locking nut 32 to the screw-31*a* portion at the end of the operation shaft 31 in screw engagement.

In other words, a structure of connection of the movable body 16 to the fixed body 14 provides an extension/contraction mechanism for extending or contracting the apparatus body 12 on the shaft center of the main shaft 4. The screw 31*c* formed on the outer periphery of the operation shaft 31 arranged inside the fixed body 14 and the screw hole 22*c* of the movable plate 22 provide a screw mechanism for screw-feeding the movable body 16 in the shaft center direction of the main shaft 4 with respect to the fixed body 14. Insertion engagement of the connecting rods 21 on the fixed body-14 side with the movable plate 22 and insertion engagement of the connecting rods 24 on the movable body-16 side with the regulation plate 19 provide a regulation means for regulating the rotation of the movable body 14 about the axis with respect to the fixed body 16 and a guide means for guiding the movable body 16 slidably in the main shaft-direction with respect to the fixed body 14.

Figure 6:
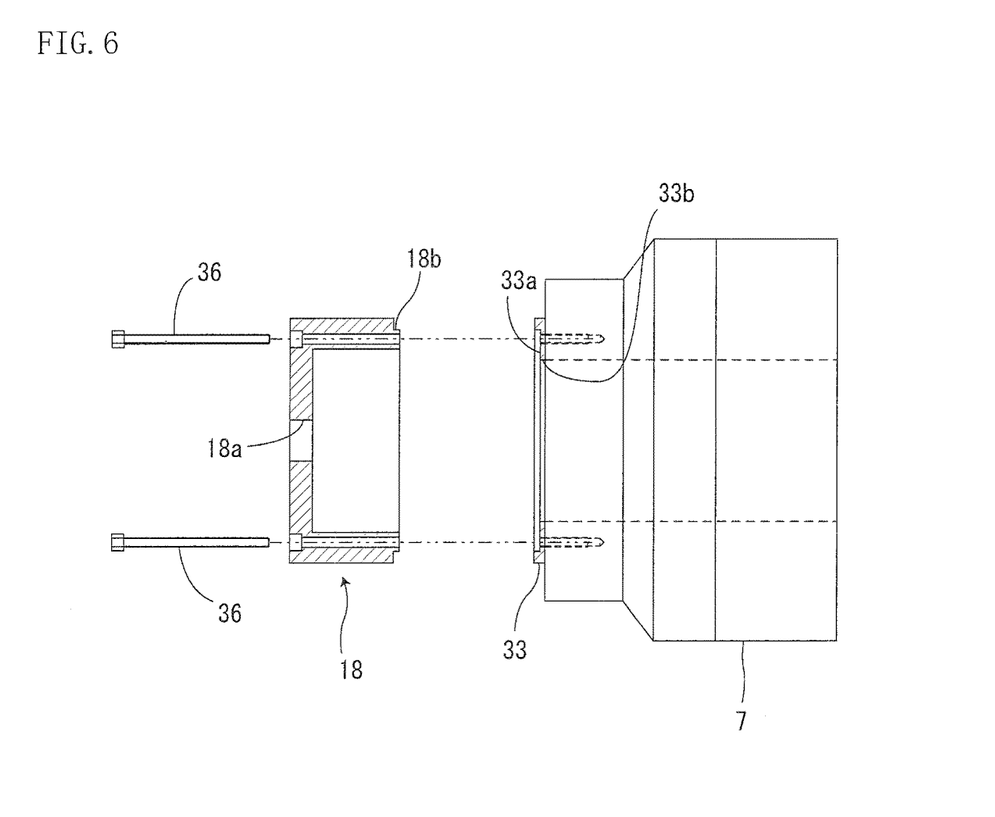
FIG. 6 is a side view showing the configuration of a mounting sleeve.

FIG. 6 is a side view showing the configuration of the mounting sleeve. On an outside end surface of the chuck cylinder 7, there is arranged a disc-shaped fixed plate 33 having the center located in the shaft center of the main shaft 4. In the fixed plate 33, there is formed a cocentrically circular-shaped recessed portion 33a. In a bottom of the recessed portion 33a, there is formed a circular-shaped insertion hole 33b that permits the piston 9 to be inserted through.

An outer periphery of the open end of the mounting sleeve 18 provides an insertion portion 18b whose diameter is reduced as compared with the other portion. The insertion portion 18b is fitted and inserted into the recessed portion 33a of the fixed plate 33. In this state, the mounting sleeve 18 is detachably attached and fixed to the chuck cylinder 7 with mounting bolts 36 that are placed in parallel in the main shaft-4 direction after being inserted through a peripheral wall of the mounting sleeve 18. In this connection, with the mounting sleeve 18 bolted to the chuck cylinder 7, the insertion portion 18b of the mounting sleeve 18 gets located at an inner periphery side of the recessed portion 33a of the fixed plate 33, and besides, the cylindrical-shaped end of the piston 9 gets placed in such a position as to face an inner periphery side of the mounting sleeve 18 in an axially movable state (see FIG. 1).

Figure 7A:
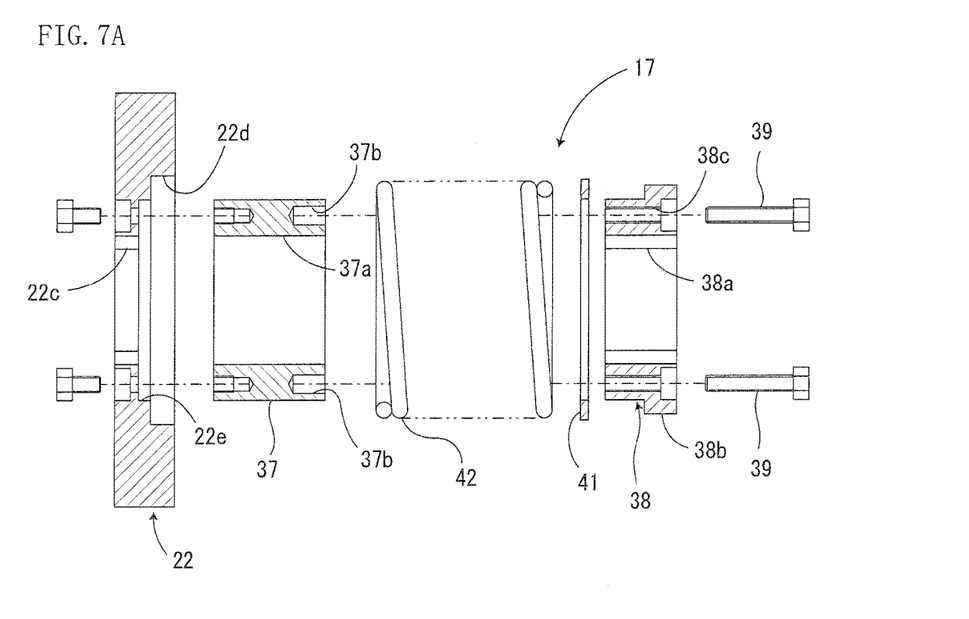
FIGS. 7(A) and 7(B) are an exploded sectional side view and a sectional side view respectively showing a prevention mechanism.
Figure 7B:
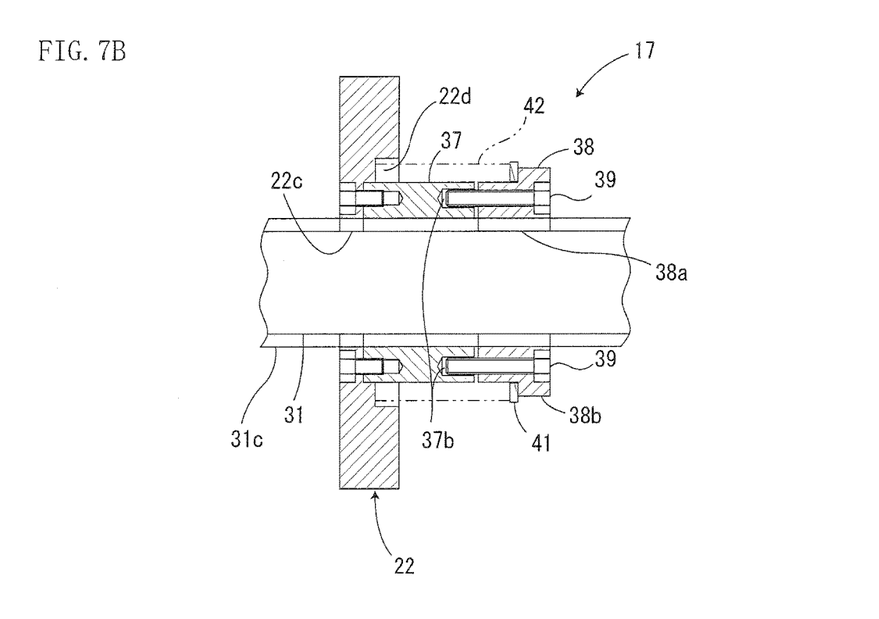

FIGS. 7(A) and 7(B) are respectively an exploded sectional side view and a sectional side view of the prevention mechanism. The prevention mechanism 17 has the above movable plate 22, an installation sleeve 37 that permits the operation shaft 31 to be inserted through, a prevention sleeve 38 located at the side opposite to the movable plate 22 with the installation sleeve 37 between to permit the operation shaft 31 to be inserted through, a connecting bolt (or a connecting shaft) 39 for connecting the installation sleeve 37 and the prevention sleeve 38 together, a locking ring 41, and a compression spring (or an elastic member) 42 externally fitted to the installation sleeve 37 and the prevention sleeve 38.

In one surface (more specifically, a surface opposite to the abutting-side plate 23) of the movable plate 22, there is provided a circular-shaped recessed portion 22d. In a bottom surface of the recessed portion 22d, there is provided a circular-shaped recessed portion 22e smaller in diameter than the recessed portion 22d. An inner periphery of the installation sleeve 37 provides an insertion hole 37a that permits the operation shaft 31 to be inserted through. An outer peripheral surface of the movable plate 22-side end of the installation sleeve 37 is fitted and inserted into the recessed portion 22e of the movable plate 22 and bolted thereto.

An inner periphery of the prevention sleeve 38 provides a screw hole 38a that permits the operation shaft 31 to be inserted through in screw engagement. On such one end of the prevention sleeve 38 as to be opposite to the installation sleeve 37, there is formed a flange 38b integrally. The locking ring 41 is externally fitted to the prevention sleeve 38 under the condition that it is locked with the flange 38b. One end side of the compression spring 42 is inserted into the recessed portion 22d, and the other end side thereof is locked with the locking ring 41, in which state, external fitting of the compression spring to the installation sleeve 37 and the prevention sleeve 38 is provided.

In the prevention sleeve 38, there are formed more than one bolt hole 38c around the axis to permit the connecting bolts 39 to be inserted through and fixed thereto. Meanwhile, the fore end of each connecting bolt 39 placed in such a position as to face the installation sleeve-37 side after being inserted through the bolt hole 38c of the prevention sleeve 38 is inserted axially movably into a connection hole 37b formed in the prevention sleeve 38-side end of the installation sleeve 37.

Such connection of the installation sleeve 37 to the prevention sleeve 38 with the connecting bolts 39 permits the prevention sleeve 38 to go into a state in which it makes no rotation about the axis of the operation shaft 31 with respect to the movable plate 22. For that reason, rotation of the operation shaft 31 about the axis causes the prevention sleeve 38 to be moved in the main shaft-4 direction together with the movable body 16 in a body. At this time, the prevention sleeve 38 and the movable plate 22 brought into screw engagement with the operation shaft 31 are energized in a direction to separate from each other by an elastic force of the compression spring 42. A play resulting from screw engagement is prevented by such energization.

In this manner, the prevention mechanism 17 for energizing the screw-engaged movable body 16 in the main shaft 4-direction prevents a backlash caused by the play occurring at the time of extending or contracting or the like of the rotating positioning apparatus 11.

The positioning apparatus 11 having the above configuration is such that after contracting the apparatus body 12 to a certain extent of length, the positioning apparatus 11 is inserted into the main shaft 4, and the mounting sleeve 18 is then attached and fixed to the chuck cylinder 7, while the apparatus body 12 is extended up to a position where the abutting portion 26 abuts the work W held by the chuck 6, leading to a completion of positioning of the work W.

In such state, the O ring 29 of the abutting member 26 gives an increased intra-sealability of the main shaft 4, so that processing water and/or machine chips on the work-W side are prevented from entering in a mixed state into a more inner side within the main shaft 4 than the abutting member 26. In this manner, positioning of the work W in the main shaft-4 direction is obtained under the condition that airtightness and water-tightness are both held, so that a higher convenience and an increased machining accuracy are both provided. In this connection, the length (or the overall length) of the positioning apparatus 11 in the main shaft-4 direction is maximized at the time of attainment of extending up to a position where the prevention sleeve 38 of the prevention mechanism 17 makes contact with the regulation plate 19.

Figure 8A:
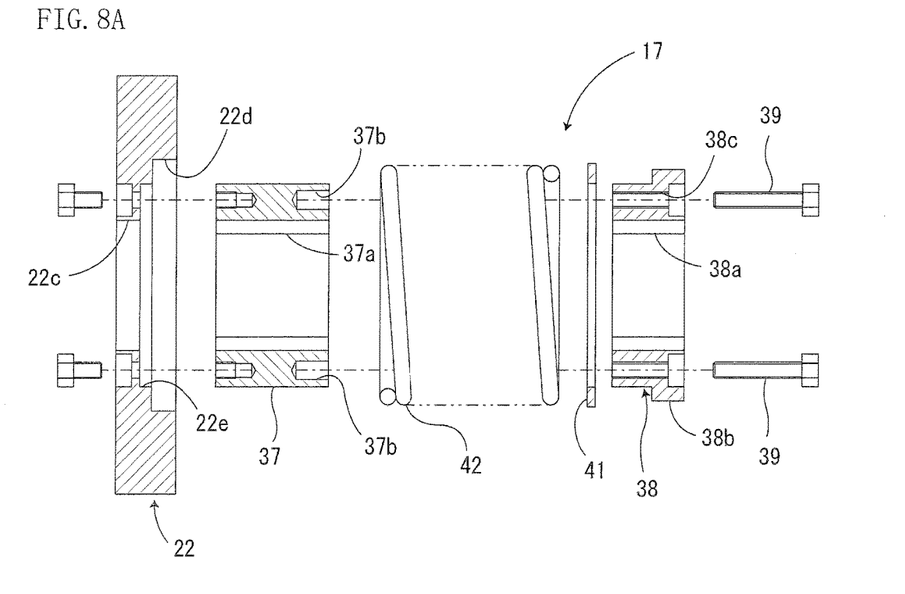
FIGS. 8(A) and 8(B) are an exploded sectional side view and a sectional side view respectively showing the configuration of another embodiment of the prevention mechanism.
Figure 8B:
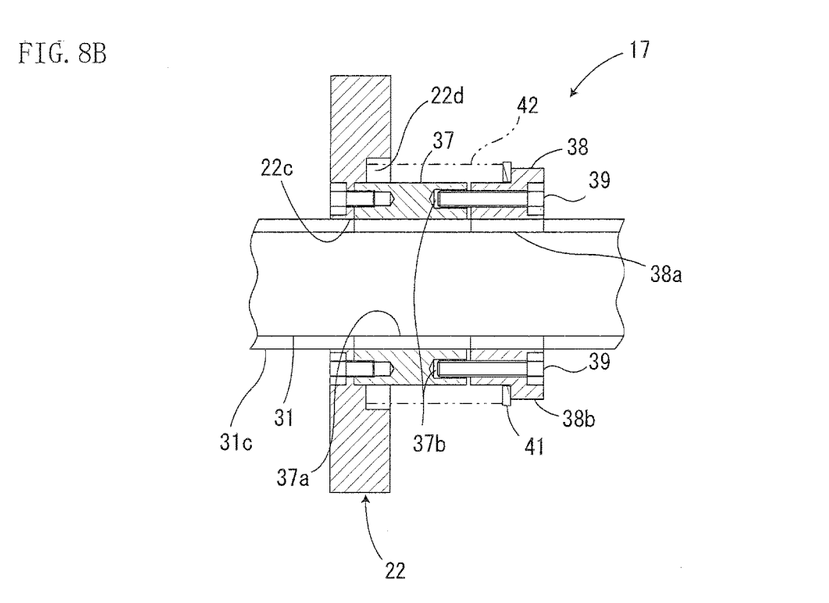

FIGS. 8(A) and 8(B) are respectively an exploded sectional side view and a sectional side view of the configuration of another embodiment of the prevention mechanism. The prevention mechanism 17 shown in FIG. 8 is such that the insertion hole 37a of the installation sleeve 37 provides a screw hole that permits the operation shaft 31a to be inserted through in screw engagement. Meanwhile, in the center of the movable plate 22, there is provided an insertion hole 22c having no screw. The operation shaft 31 is placed in the insertion hole 22c in an inserted state as well. This prevention mechanism is the same in other configurations and functional effects as the prevention mechanism 17 shown in FIG. 7.

It is noted that the installation sleeve 37 and the movable plate 22 are formed separately in the above embodiment, or alternatively, may be provided in the form of an integral unit.

Next will be described some portions different from the above embodiment in accordance with a different embodiment of the positioning apparatus 11 with reference to FIGS. 9 and 10.

Figure 9:
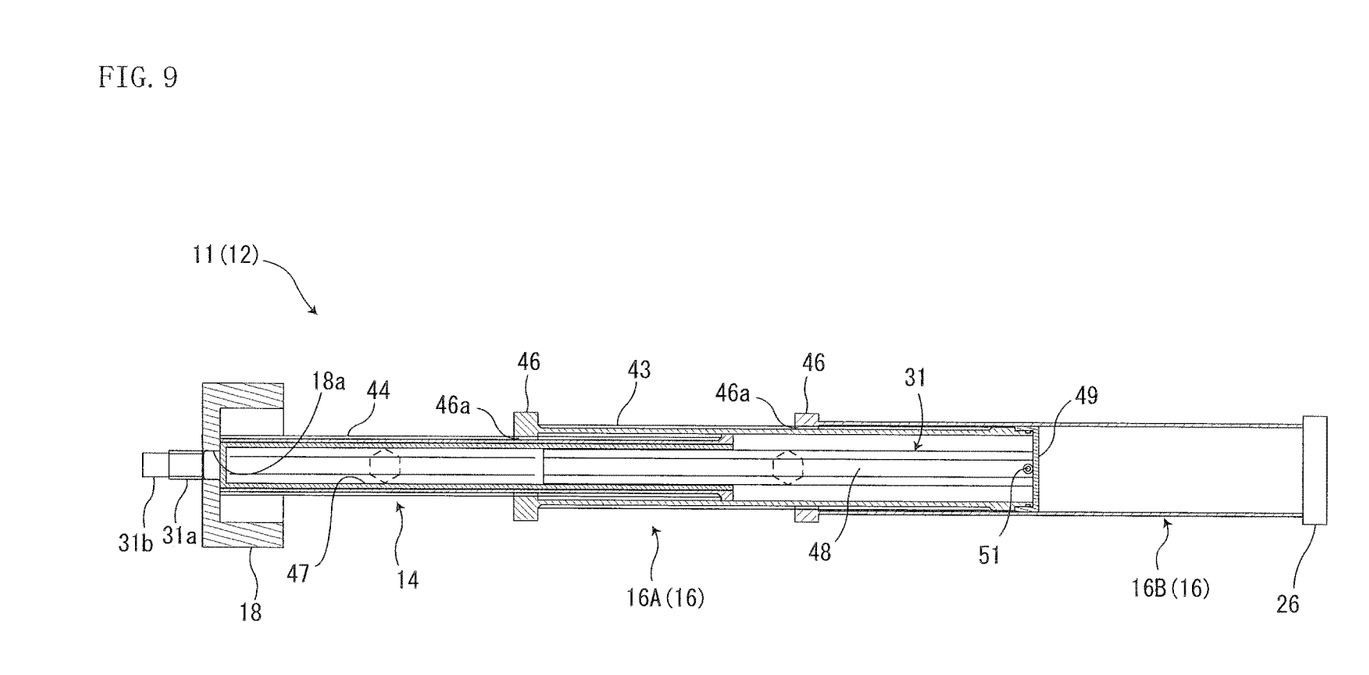
FIG. 9 is a sectional side view showing a different embodiment of the positioning apparatus.
Figure 10:
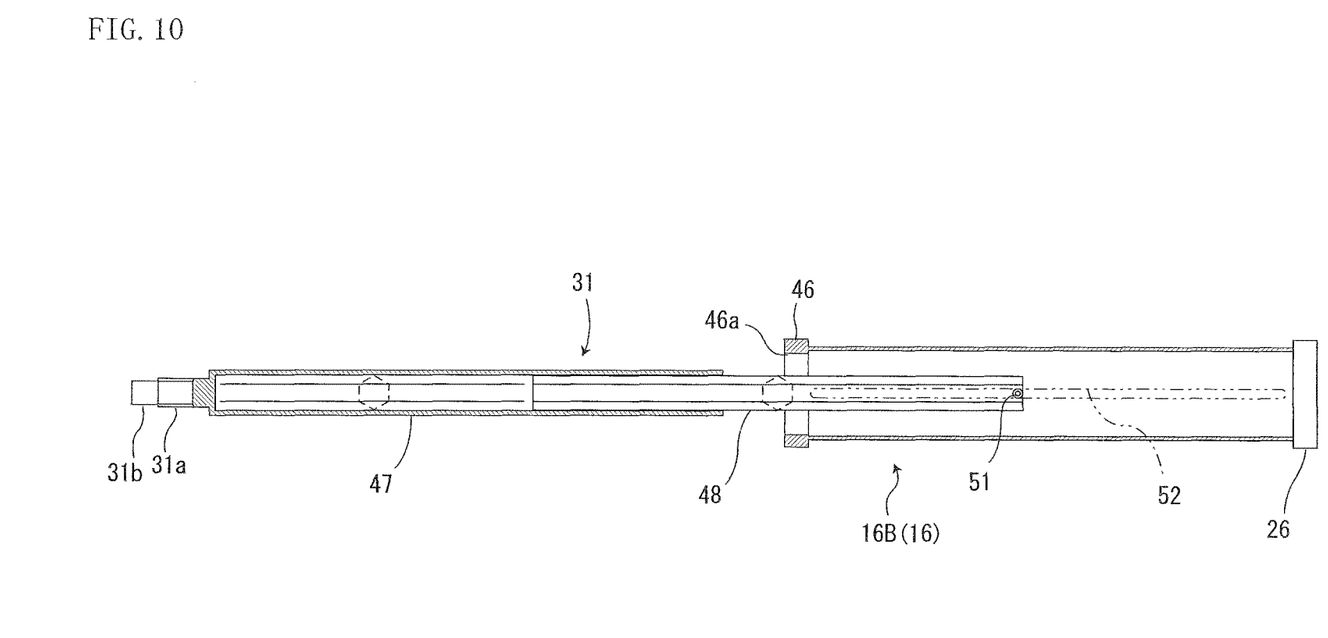
FIG. 10 is a fragmentary side view of FIG. 9.

FIG. 9 is a sectional side view showing a different embodiment of the positioning apparatus, and FIG. 10 is a fragmentary side view of FIG. 9. The positioning apparatus 11 shown has the operation shaft 31 and the fixed body 14 in the form of a single cylindrical-shaped fixed sleeve having the same shaft center as the operation shaft 31. The positioning apparatus 11 shown also has the movable body 16 in the form of a plurality of cylindrical-shaped movable sleeves 16A, 16B (or two sleeves as for the illustrated embodiment) having the same shaft center as the operation shaft 31 and different from each other in diameter.

These movable sleeves 16A, 16B are so formed as to have a gradually reduced diameter. The movable sleeves 16A, 16B nearest each other in diameter are connected together in order. The smallest-diameter movable sleeve 16A is connected to the fixed sleeve 14. The abutting member 26 is provided at an advancing-side end of the largest-diameter movable sleeve 16B.

More specifically, on an outer periphery of each movable sleeve 16A other than the movable sleeve 16B having the largest diameter, there is formed a screw 43. On an outer periphery of the fixed sleeve 14, there is also formed a screw 44. On a withdrawing-side end of each movable sleeve 14, there is formed a flange 46. On an inner periphery of the flange 46a, there is formed a screw 46a.

Then, when connecting the movable sleeves 16A, 16B nearest each other in diameter together in order, connection of both the above movable bodies is made in the manner of inserting the outer periphery of the small diameter-side movable sleeve 16A into an inner periphery of the large diameter-side movable sleeve 16A in screw engagement of the inner periphery of the flange 46 of the large diameter-side movable sleeve 16B with the outer periphery of the small diameter-side movable sleeve 16A. Meanwhile, when connecting the smallest-diameter movable sleeve 16A to the fixed sleeve 14 smaller in diameter than the above smallest-diameter movable sleeve 16A, the outer periphery of the fixed body 14 is inserted into the inner periphery of the above smallest-diameter movable sleeve 16A in screw engagement of the inner periphery of the flange 46 of the above smallest-diameter movable sleeve 16A with the outer periphery of the fixed sleeve 14.

Then, in the connected movable sleeves 16A, 16B themselves, rotation of the large diameter-side movable sleeve 16B about the axis of the operation shaft 31 (or the main shaft 4) with respect to the small diameter-side movable sleeve 16A causes the large diameter-side movable sleeve 16B to be screw-fed in the main shaft-4 direction with respect to the small diameter-side movable sleeve 16A.

Meanwhile, in the fixed sleeve 14 and the smallest-diameter movable sleeve 16A, rotation of the smallest-diameter movable sleeve 16A around the operation shaft 31 with respect to the fixed sleeve 14 causes the smallest-diameter movable sleeve 16A to be screw-fed in the main shaft-4 direction with respect to the fixed sleeve 14. In other words, the screws 44, 46, 46a formed on the peripheral walls of the fixed sleeve 14 and the movable sleeves 16A, 16B provide a screw mechanism for screw-feeding each of the movable sleeves 16A, 16B. The structure of connection of the movable sleeves 16A, 16B themselves and the structure of connection of the movable sleeve 16A to the fixed sleeve 14 provide the extension/contraction mechanism.

The operation shaft 31 has a sleeve shaft 47 and a slide shaft 48 both having the same shaft center as the main shaft 4. The slide shaft 48 is fittedly inserted into the sleeve shaft 47 and connected thereto axially slidably. The operation shaft 31 is extended or contracted by such slide action of the slide shaft 48 with respect to the sleeve shaft 47. Further, an outer periphery of the sleeve shaft 47 is of circular shape in cross section. An inner periphery of the sleeve shaft 47 has the same polygonal (more specifically, hexagonal) cross section as the slide shaft 48. With the above configuration, the slide shaft 48 is arranged to rotate together with the sleeve shaft 47 in a body.

The sleeve shaft 47 of the operation shaft 31 is inserted through and supported with the mounting sleeve 18 rotatably about the axis. An advancing-end side of the slide shaft 48 is supported rotatably about the axis with a blocking sleeve 49 that blocks an advancing-side end surface of the next largest-diameter movable sleeve (or the support-side movable sleeve) 16A to the largest-diameter movable sleeve 16B. In other words, the slide shaft 48 is moved slidably in the main shaft-4 direction together with the support-side movable sleeve 16A in a body.

Further, the advancing-side end (or the fore end) of the slide shaft 48 is connected to the largest-diameter movable sleeve 16B with a connection pin 51 extending in a direction orthogonal to the slide shaft 48. More specifically, in the peripheral wall of the largest-diameter movable sleeve (or the abutting-side movable sleeve) 16B, there is formed an axially-extending pinhole 52. The connection pin 51 is slidably supported in the pinhole 52. Such pin connection allows the abutting-side movable sleeve 16B to rotate about the axis together with the operation shaft 31 in a body, and also allows axial slidable connection of the abutting-side movable sleeve 16b to the operation shaft 31 to be established.

Then, movement of the operation shaft 31 about the axis in the direction of extension causes the abutting-side movable sleeve 16B to be rotated about the axis, in which case, a combination of the movable sleeves 16A, 16B connected together and that of the smallest-diameter movable sleeve 16A and the fixed sleeve 14 connected together are rotated about the axis in the order of their increasing rotational resistance and extended up to the maximum length position, so that the overall length of the positioning apparatus 11 is maximized under the condition that the maximum extension of each of the movable sleeves 16A, 16B is attained.

Meanwhile, movement of the operation shaft 31 about the axis in the direction of contraction causes the abutting-side movable sleeve 16B to be rotated about the axis, in which case, a combination of the movable sleeves 16A, 16B connected together and that of the smallest-diameter movable sleeve 16A and the fixed sleeve 14 connected together are rotated about the axis in the order of their increasing rotational resistance and contracted down to the minimum length position, so that the overall length of the positioning apparatus 11 is minimized under the condition that the minimum contraction of each of the movable sleeves 16A, 16B is attained.

In accordance with the above configuration, it would be appreciated that a change ratio of a maximum value to a minimum value in the overall length of the positioning apparatus 11 may be set larger. It is noted that there may be provided the flange 46 for each movable sleeve 16A, and the above preventing mechanism in a portion where the flange 46 is screw-engaged, or alternatively, there may be formed a screw on the whole of the inner periphery of each movable sleeve 16.

EXPLANATION OF REFERENCE NUMERALS

4: Main shaft
6: Chuck (Holding portion)
12: Apparatus body
14: Fixed body (Fixed sleeve)
16: Movable body
16A: Movable body (Movable sleeve)
16B: Movable body (Movable sleeve)
17: Prevention mechanism (Prevention means)
18: Mounting sleeve (Mounting portion)
26: Abutting member (Abutting portion)
31: Operation shaft
31c: Screw
43: Screw
44: Screw
46a: Screw
W: Work (Object to be machined, Workpiece)

The invention claimed is:

1. A lathe positioning apparatus for positioning a chucked work in a main shaft direction, the lathe positioning apparatus comprising:
   an apparatus body having a shaft center along the main shaft direction and arranged such that an abutting portion that abuts the work is formed on a chuck-side end of the apparatus body; and
   an extension/contraction mechanism provided inside said apparatus body to advance or withdraw the abutting portion with respect to a chuck by extending or contracting the apparatus body in the main shaft direction,
   wherein said apparatus body has the same shaft center as the main shaft, and extending or contracting of the apparatus body is provided on the shaft center of the main shaft by said extension/contraction mechanism,
   said apparatus body has a fixed body and a movable body both having the same shaft center as the main shaft, said fixed body is axially fixed in position, said movable body is connected to the fixed body slidably in the main shaft direction, and said extension/contraction mechanism is provided to change a length of said apparatus body in the main shaft direction by moving said movable body slidably in the main shaft direction with respect to the fixed body,
   said extension/contraction mechanism has a screw mechanism for moving said movable body slidably in the main shaft direction with respect to the fixed body, and an operation shaft arranged inside said fixed body so as to have the same shaft center as said fixed body in order to actuate the screw mechanism by rotation about an axis of the operation shaft itself,
   the chuck is attached to one end of the main shaft and a chuck cylinder is attached to another end of the main shaft, a chuck cylinder side end of the operation shaft is provided to rotate the operation shaft about an axis of the operation shaft itself, and the chuck cylinder is provided to permit the work to be held or released by the chuck.

2. The lathe positioning apparatus according to claim 1, further comprising a prevention means provided in a part of connection of the fixed body to the movable body to prevent a play in said part of connection.

3. The lathe positioning apparatus according to claim 1, wherein said screw mechanism has a screw formed on an outer periphery of the operation shaft, said movable body permits said operation shaft to be inserted therethrough in screw engagement, and a regulation means for regulating rotation of the movable body around the operation shaft with respect to the fixed body.

4. The lathe positioning apparatus according to claim 1, wherein
   said movable body is provided in the form of a plurality of cylindrical-shaped movable bodies different in diameter from each other,
   said fixed body is provided in the form of a cylindrical-shaped fixed body having an outer periphery brought into screw engagement with an inner periphery of the smallest-diameter movable body,
   connection of said plurality of movable bodies themselves is made in order by inserting an outer periphery of one movable body of smaller diameter in a pair of movable bodies nearest each other in diameter into an inner periphery of the other movable body of larger diameter in screw engagement, and
   said screw mechanism is composed of a screw formed on the outer periphery of the fixed body and screws respectively formed on the outer periphery of the smallest-diameter movable body and the inner periphery of each movable body other than the largest-diameter movable body.

* * * * *